Figure 1:
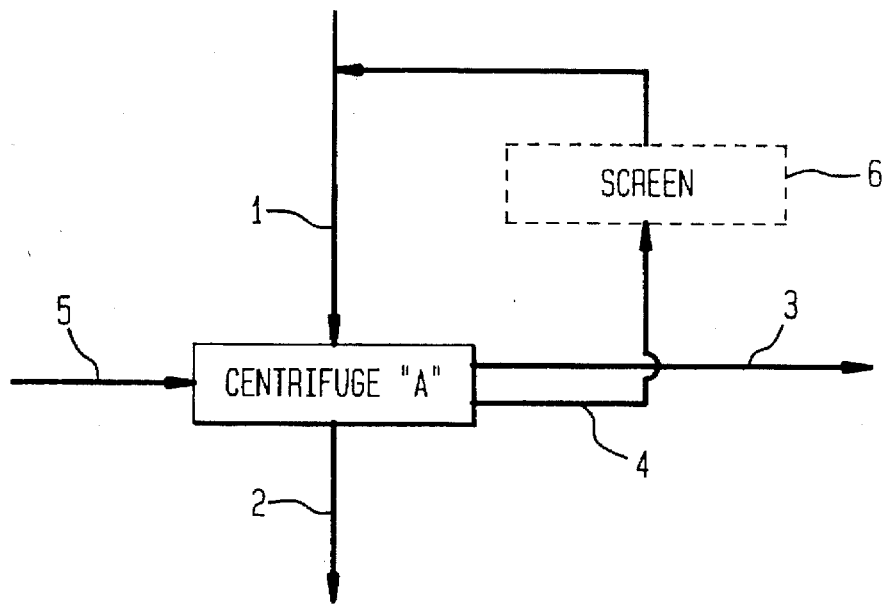

United States Patent [19]
Kunz

[11] Patent Number: 5,674,322
[45] Date of Patent: Oct. 7, 1997

[54] PROCESS FOR THE CENTRIFUGAL TREATMENT OF A SUSPENSION CONTAINING STARCH

[75] Inventor: Herbert Kunz, Osnabrück, Germany

[73] Assignee: Westfalia Separator AG, Oelde, Germany

[21] Appl. No.: 424,333

[22] PCT Filed: Jun. 28, 1994

[86] PCT No.: PCT/DE94/00755

§ 371 Date: May 31, 1995

§ 102(e) Date: May 31, 1995

[87] PCT Pub. No.: WO95/06667

PCT Pub. Date: Mar. 9, 1995

[30] Foreign Application Priority Data

Aug. 30, 1993 [DE] Germany .................. 43 29 111.2

[51] Int. Cl.[6] ............. C08B 30/00; B01D 15/00; C13D 3/12; C13F 1/06
[52] U.S. Cl. ................. 127/65; 127/53; 127/56; 127/67; 127/69; 127/71
[58] Field of Search ................. 127/53, 56, 65, 127/67, 69, 71

[56] References Cited

U.S. PATENT DOCUMENTS

| | | | |
|---|---|---|---|
| 2,478,992 | 8/1949 | Wheelwright | 233/29 |
| 2,599,619 | 6/1952 | Eckers | 127/67 |
| 2,798,011 | 7/1957 | Fontein et al. | 127/65 |
| 3,498,605 | 3/1970 | Plaven | 127/67 |
| 3,756,854 | 9/1973 | Hemfort et al. | 127/24 |
| 3,948,677 | 4/1976 | Huster et al. | 127/66 |
| 4,132,566 | 1/1979 | Verbeme et al. | 127/65 |
| 4,144,087 | 3/1979 | Chwalek et al. | 127/67 |
| 4,207,118 | 6/1980 | Bonnyay | 127/24 |
| 5,198,035 | 3/1993 | Lee et al. | 127/65 |
| 5,439,526 | 8/1995 | Czuchajowska et al. | 127/56 |

FOREIGN PATENT DOCUMENTS

| | | | |
|---|---|---|---|
| 0 506 233 | 9/1992 | European Pat. Off. | C08B 30/02 |
| 23 23 248 | 11/1974 | Germany | C13L 1/00 |

Primary Examiner—Glenn A. Caldarola
Assistant Examiner—Patricia L. Hailey
Attorney, Agent, or Firm—Henry M. Feiereisen

[57] ABSTRACT

In the process, a starch-containing suspension 1 is divided at admixture of washing liquid 5 in a centrifuge "A" into starch-containing concentrate 2, a first liquid phase 3 with primarily dissolved substances and a second liquid phase 4 with primarily undissolved substances. The first liquid phase 3 is especially suitable as washing liquid in counterflow washing processes as it contains no obstructive undissolved substances. Also, the disposal of this liquid phase is simpler. The second liquid phase 4 with the undissolved substances is generated in higher concentration compared to conventional processes so that the processing of this phase is less cumbersome.

7 Claims, 3 Drawing Sheets

PROCESS FOR THE CENTRIFUGAL TREATMENT OF A SUSPENSION CONTAINING STARCH

The present invention refers to a process for centrifugal treatment of a starch-containing suspension which additionally contains dissolved and undissolved substances, with a separation of the suspension into a concentrate rich in starch and a fraction deficient in starch being effected in a centrifuge with admixture of washing liquid.

Such a method is known for example from the DE 23 23 248 C3. The starch-containing suspension is recovered through decomposition of plant-based raw material such as e.g. potatoes, tapioca, wheat and corn. An objective is the production of a pure starch at minimum expenditure on machines, energy, operational substances and auxiliary substances. The dissolved and undissolved substances contained in the suspension must be separated from the starch and recovered as by-product or disposed as waste water. Respective processes were developed in this regard which are very cost-intensive.

In the known process, the starch-containing suspension is separated in a multistage-staged centrifugal station with admixture of washing liquid into a pure starch concentrate and a liquid phase which primarily contains dissolved and undissolved substances. The washing liquid is conducted preferably in counterflow, i.e. it is supplied to the last centrifugal stage and the separated liquid phase is supplied as washing liquid to the respectively preceding centrifugal stage. The liquid phase is enriched thereby with dissolved and undissolved substances and is withdrawn from the first centrifugal station for further treatment. To increase the effectiveness of the washing process, the centrifuges may be provided with a washing unit through which the washing fluid is conducted directly to the starch concentrate still retained in the centrifuge.

The invention is based upon the object to create a process by which the effectiveness of the washing operation is increased and the costs for processing the liquid phase are reduced.

This object is attained by dividing the starch-deficient fraction in the centrifuge in a first liquid phase containing primarily dissolved substances and into a second liquid phase containing primarily undissolved substances, with the first liquid phase being fed as washing liquid to a preceding centrifuge.

Since the first liquid phase contains no or only few obstructive undissolved substances, is in particular suitable as washing liquid because the effectiveness of the washing process is improved thereby. Also the disposal of this liquid phase after carrying out the washing process is significantly facilitated in view of the removed undissolved substances.

The second liquid phase with the undissolved substances such as e.g. fibers, cell fragments, gluten particles and slimy substances is produced at a higher concentration compared to known processes because the fraction of the first liquid phase is omitted. Thus, the processing of this phase requires less energy and less cumbersome machinery.

Advantageous embodiments of the invention are reflected in the dependent claims.

For carrying out the process, a centrifuge is suitable which enables a classification of the solids contained in the suspension and their separate discharge from the centrifuge is possible. Such a centrifuge is described for example in the not pre-published DE-P 43 22 415.6. However, also other separating devices, like e.g. cyclones, for carrying out the process are suitable.

Exemplified embodiments of the invention are schematically illustrated in the drawing and will now be described in more detail.

Figure 2:
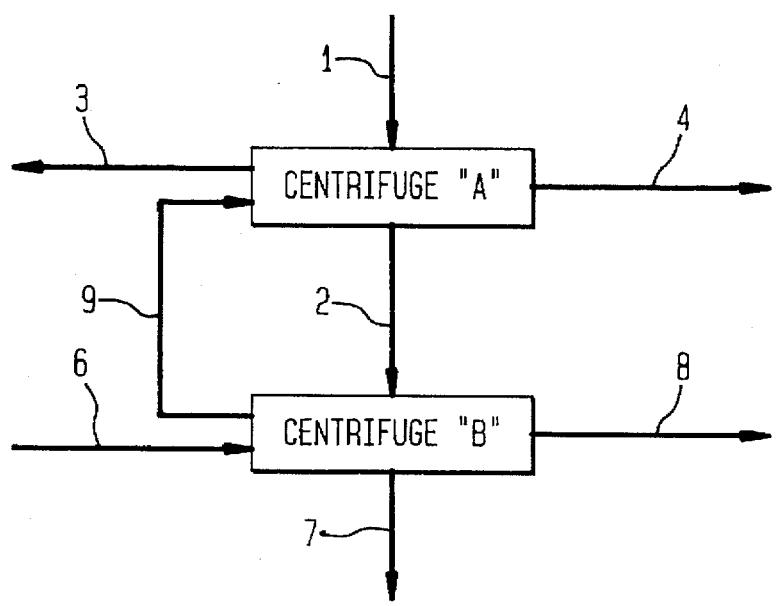
Figure 3:
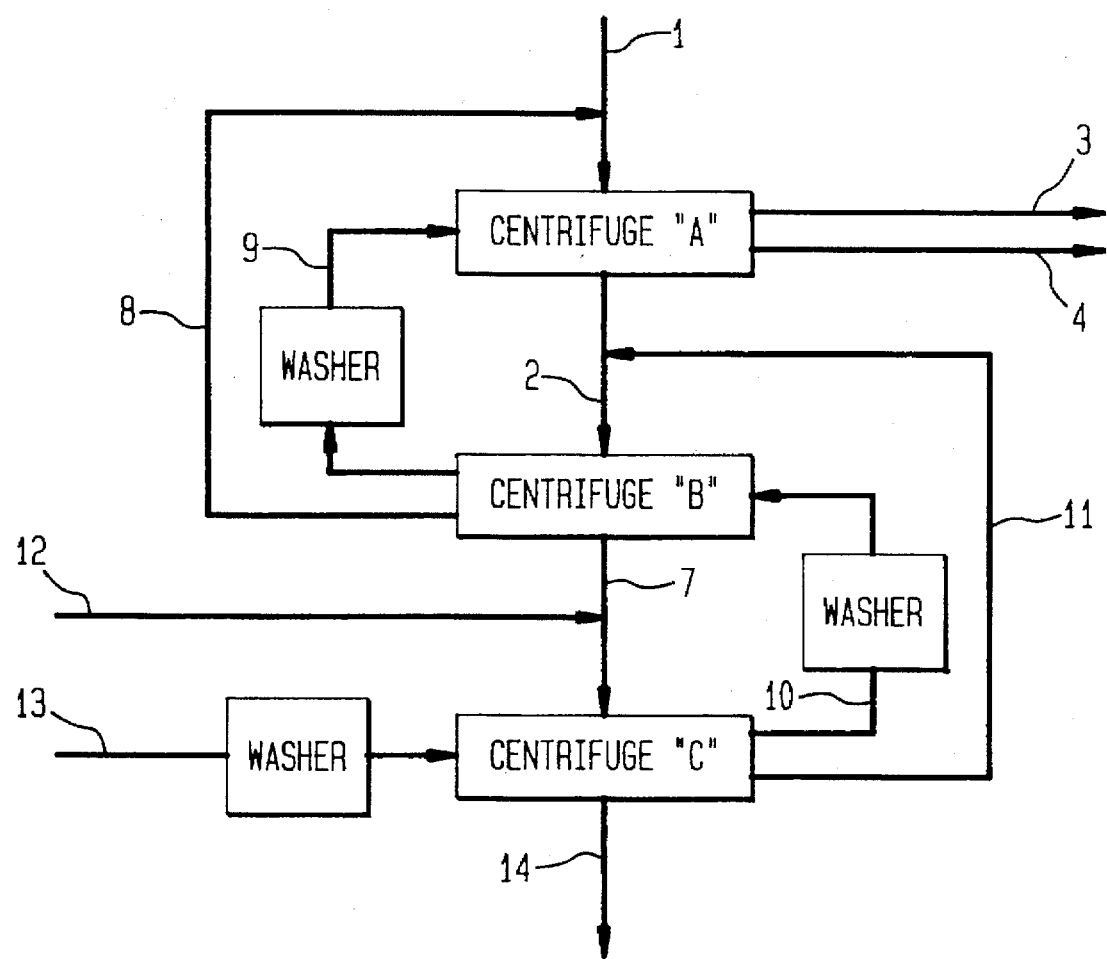
Figure 4:
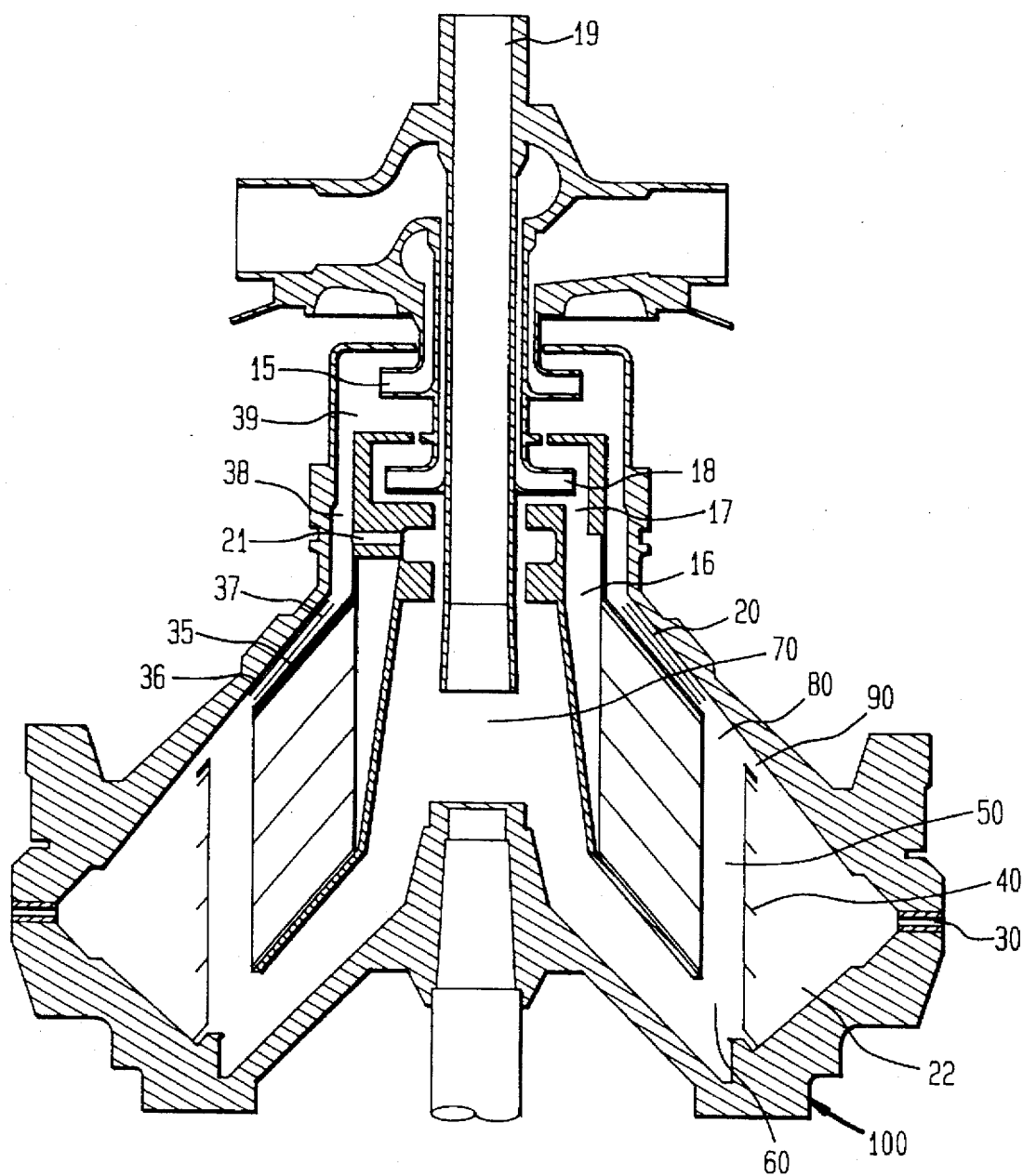

FIG. 1 shows a one-step centrifugal treatment,
FIG. 2 shows a two-step centrifugal treatment,
FIG. 3 shows a three-step centrifugal treatment,
FIG. 4 shows a centrifuge for carrying out the process.

"A" designates in FIG. 1 the centrifuge in which a starch-containing suspension 1 is separated into a concentrate 2 rich on starch, a first liquid phase 3 containing dissolved substances and a second liquid phase 4 containing the undissolved substances. Washing liquid 5 is conducted via a not shown washing unit into the centrifuge "A" which washes out dissolved and undissolved substances from the starch and subsequently separates into both liquid phases 3 and 4. After separation of the undissolved substances by means of a sieve 6, the second liquid phase 4 can be mixed with the starch-containing suspension 1 and returned into the centrifuge "A".

FIG. 2 shows the arrangement of a further centrifuge "B" besides the centrifuge "A". In a manner as previously described, the starch-containing suspension 1 is separated in a first liquid phase 3 and a second liquid phase 4 for allowing further treatment. The starch-containing concentrate 2 exiting the centrifuge "A" is separated in the centrifuge "B" at simultaneous admixture of washing liquid 6 in starch-containing concentrate 7, a second liquid phase 8 and a first liquid phase 9 which is fed as washing liquid to the centrifuge "A".

The process according to FIG. 3 provides three centrifuges, "A", "B" and "C". The starch-containing suspension 1 is separated in the centrifuge "A" into a starch-containing concentrate 2, a first liquid phase 3 and a second liquid phase 4. In the first centrifuge "A", the first liquid phase 9 and the second liquid phase 8 serves as washing liquid and are supplied from the centrifuge "B". The first liquid phase 9 is fed via a washing unit and the second liquid phase 8 is fed together with the starch-containing suspension 1 to the centrifuge "A". The starch-containing concentrate 2 is separated in the centrifuge "B" into both liquid phases 8, 9 and starch-containing concentrate 7. In the second centrifuge "B", the liquid phases 10 and 11 serve as washing liquid and are supplied from the centrifuge "C" partially mixed with starch-containing concentrate 2 and partially supplied via a washing unit. The starch-containing concentrate 7 exiting the centrifuge "B" is mixed with fresh water 12 and supplied to the centrifuge "C", with further fresh water 13 being fed thereto via a washing unit. The purified starch 14 is discharged from the centrifuge "C".

In the process according to FIGS. 1, 2 and 3, the dissolved and undissolved solids are generated in separate process flows. Thus, their further processing or disposal is considerably simplified. The respective processes for after-treatment of these fluids can thereby be effected in a significantly more cost-efficient manner.

The process is carried out with a centrifugal drum 100 according to FIG. 4, with the starch-containing suspension being fed via a supply conduit 19 into an inlet space 70 and flowing via inlet openings 60 into riser channels 50 of a disk insert 40. In opposition to the inlet openings 60, the riser channels 50 exhibit outlet openings 80 which communicate with a space 22 for solids via connecting passageways 90 formed between an inside wall of the centrifugal drum 100 and a concentric outer wall of an intermediate disk 35, with the outer wall being provided with interposed spacers 36. The passageways 90 are connected with the inlet space 70 by channels 21 and form radially inwardly directed channels 37 which connect via outlet openings 38 to a skimming chamber 39 that accommodates a skimming member 18. Disks 20 are further provided between the inner wall of the centrifugal drum 100 and the outer wall of the intermediate disk 35. The starch-containing concentrate separated in the disk insert 40 is collected in the space 22 for solids before being discharged via nozzles 30. The first liquid phase with the dissolved substances is conducted via channel 16 and the skimming member 18 from the centrifugal drum 100. The cross section of the nozzles 30 is dimensioned in such a manner that primarily starch concentrate is discharged and the remaining dissolved substances are displaced radially inwardly into the riser channels 50. These undissolved substances are conducted with the second liquid phase via the outlet openings 80 and connecting channels 38 in a skimming chamber 39 and withdrawn by means of skimming member 15. This classifying effect allows discharge of two types of solids from the centrifugal drum.

I claim:

1. A process for centrifugal treatment of a starch-containing suspension which contains additionally dissolved and undissolved substances, said process comprising the steps of:

separating the suspension in a first centrifuge at admixture of washing liquid into a starch-containing concentrate and a fraction deficient in starch; and dividing the fraction deficient in starch in the first centrifuge into a first liquid phase primarily containing dissolved substances and a second liquid phase primarily containing undissolved substances.

2. The process of claim 1, and further comprising the steps of directing the starch-containing concentrate into a second centrifuge for separation into a concentrate rich in starch and a fraction deficient in starch; dividing the fraction deficient in starch in the second centrifuge into a first liquid phase primarily containing dissolved substances and a second liquid phase primarily containing undissolved substances; and returning the first liquid phase of the second centrifuge as washing liquid into the first centrifuge.

3. The process of claim 2, and further comprising the steps of directing the concentrate rich in starch of the second centrifuge into a third centrifuge for separation into a concentrate further enriched in starch and a fraction deficient in starch; dividing the fraction deficient in starch in the third centrifuge into a first liquid phase primarily containing dissolved substances and a second liquid phase primarily containing undissolved substances; and returning the first liquid phase of the third centrifuge as washing liquid into the second centrifuge.

4. The process of claim 3, and further comprising the step of conducting the first liquid phase of the centrifuges in counted low as washing liquid through the centrifuge positioned upstream thereof.

5. The process of claim 4 wherein the second liquid phase is fed to an inlet of the centrifuge positioned upstream thereof, and the first liquid phase is conducted into a washing unit of the centrifuge positioned upstream thereof.

6. The process of claim 3 and further comprising the step of conducting the second liquid phase of the centifuges in counterflow as washing liquid through the centrifuge positioned upsteam thereof.

7. The process of claim 3, wherein the second liquid phase is returned into the centrifuge positioned upstream thereof after separation of the undissolved substances by means of a separator.

* * * * *